US008616956B2

(12) United States Patent
Englman et al.

(10) Patent No.: US 8,616,956 B2
(45) **Date of Patent: *Dec. 31, 2013**

(54) GAMING SYSTEM WITH PLAY ENHANCEMENT ICONS

(71) Applicant: WMS Gaming Inc., Waukegan, IL (US)

(72) Inventors: Allon G. Englman, Chicago, IL (US); Jeremy M. Hornik, Chicago, IL (US); Daniel P. Louie, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,609

(22) Filed: Dec. 6, 2012

(65) Prior Publication Data

US 2013/0095907 A1 Apr. 18, 2013

Related U.S. Application Data

(63) Continuation of application No. 12/740,579, filed as application No. PCT/US2008/012230 on Oct. 28, 2008, now Pat. No. 8,328,622.

(60) Provisional application No. 61/001,654, filed on Nov. 2, 2007, provisional application No. 61/123,332, filed on Apr. 8, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................. 463/20; 463/21; 463/22; 463/23; 463/24; 463/25; 273/292

(58) Field of Classification Search

USPC .............................. 463/20-25; 273/143, 292

See application file for complete search history.

(56) References Cited

U.S. PATENT DOCUMENTS

| | | | | |
|---|---|---|---|---|
| 2006/0189376 | A1 | 8/2006 | Hornik et al. | 463/20 |
| 2006/0264254 | A1* | 11/2006 | Aoki | 463/20 |
| 2009/0124339 | A1* | 5/2009 | Barton et al. | 463/20 |

FOREIGN PATENT DOCUMENTS

| | | | |
|---|---|---|---|
| WO | 02/099760 | 12/2002 | G07F 17/32 |

OTHER PUBLICATIONS

International Search Report mailed Dec. 31, 2008 which issued during prosecution of corresponding International Patent Application No. PCT/US2008/012230 (2 pages).

International Written Opinion mailed Dec. 31, 2008 which issued during prosecution of corresponding International Patent Application No. PCT/US2008/012230 (3 pages).

* cited by examiner

*Primary Examiner* — Omkar Deodhar
*Assistant Examiner* — Adetokunbo O Torimiro
(74) *Attorney, Agent, or Firm* — Nixon Peabody LLP

(57) ABSTRACT

A gaming system comprises a wager input device for receiving a wager and a display for displaying a wagering game having a plurality of reels comprised of a plurality of symbols. A controller operates to (i) detect receipt of the wager; (ii) activate a play of the wagering game by spinning the reels on the display; (iii) display at least one play enhancement icon on the display; (iv) cause the spinning reels to stop and the display to display a randomly selected outcome of the wagering game; and (v) enhance the randomly selected outcome of the wagering game in response to the at least one play enhancement icon on the display at any time including at least one of before spinning the reels on the display, during spinning the reels on the display, and after spinning the reels on the display.

20 Claims, 7 Drawing Sheets

GAMING SYSTEM WITH PLAY ENHANCEMENT ICONS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system with play enhancement icons providing bonus features at any time during the wagering game.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One problem that arises with traditional games is that an inherent predictability of the frequency and display of bonus or secondary awards occurs after repeated play of the wagering game. Another problem that occurs is that the amounts of bonus or secondary awards provided for certain bonus events triggered is fixed, causing the presentation of such awards to become repetitive and less exciting. Yet another problem with such traditional systems is that player's anticipation and excitement related to achieving bonus awards dissipates over repeated play of a wagering game, causing the game play experience to be less rewarding and thus, the game to be less desirable relative to other available wagering games. The present invention is directed to solving these and other problems.

SUMMARY OF THE INVENTION

According to one aspect of the present invention, a gaming system comprises a wager input device for receiving a wager and a display for displaying a wagering game having a plurality of reels comprised of a plurality of symbols. A controller operates to detect receipt of the wager and activate a play of the wagering game by spinning the reels on the display. The controller further displays at least one play enhancement icon on the display and causes the spinning reels to stop and the display to display a randomly selected outcome of the wagering game. The randomly selected outcome of the wagering game is enhanced in response to the at least one play enhancement icon on the display at any time including at least one of before spinning the reels on the display, during spinning the reels on the display and after spinning the reels on the display.

According to another aspect of the invention, a method of operating a wagering game having a display displaying a plurality of reels including a plurality of symbols comprises receiving a wager from a player and activating a play of the game by spinning the reels on the display. A play enhancement icon is displayed on the display. An outcome of the game is enhanced in response to the play enhancement loon on the display at any time including at least one of before spinning the reels on the display, during spinning the reels on the display and after spinning the reels on the display.

According to yet another aspect of the invention, a method of operating a wagering game having a display displaying a plurality of reels including a plurality of symbols comprises receiving a wager from a player and activating a play of the game by spinning the reels on the display. The method further comprises displaying a play enhancement icon and stopping one or more of the spinning reels. One or more symbols are changed on the stopped one of more reels in response to the play enhancement icon. The stopped one or more reels are then spun again.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
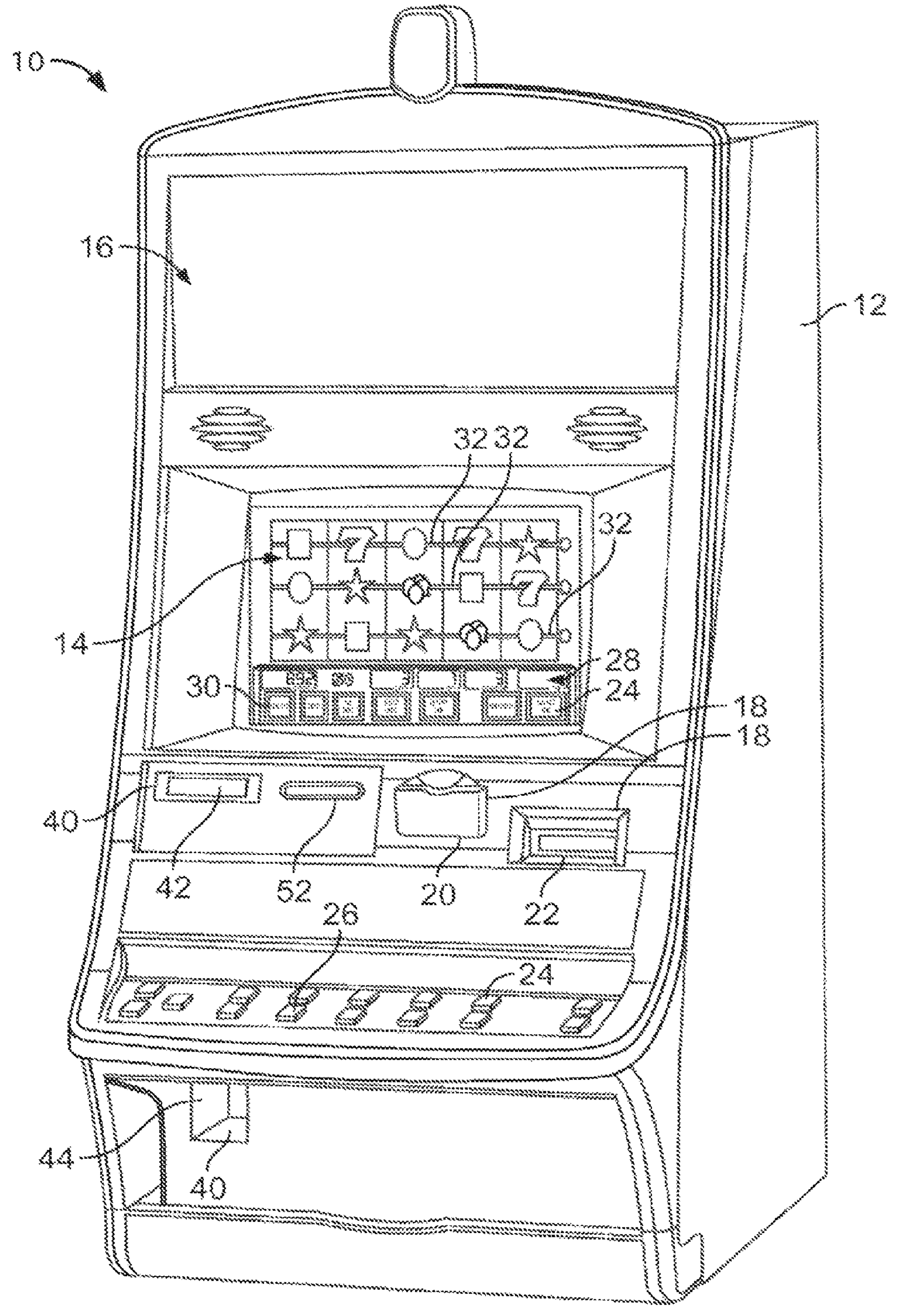
FIG. 1*a* is a perspective view of a free standing gaming machine embodying the present invention.

While this invention is susceptible of embodiment in many different forms, there is shown In the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, any ether game compatible with a display comprising at least one symbol-hearing reel strip. The gaming machine 10 may also be a hybrid gaming machine integrating both electronic and electromechanical displays.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player Input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 of the gaming machine 10 may include a number of mechanical reels to display the outcome in visual association with at least one payline 32. Alternatively, the primary display 14 may take the form of a hybrid display incorporating both electromechanical display components, such as reels, with an electronic display, which may include a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player Information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. In some embodiments, the information reader 52 may be used to restore game assets that the player achieved and saved during a previous game session.

Figure 1B:
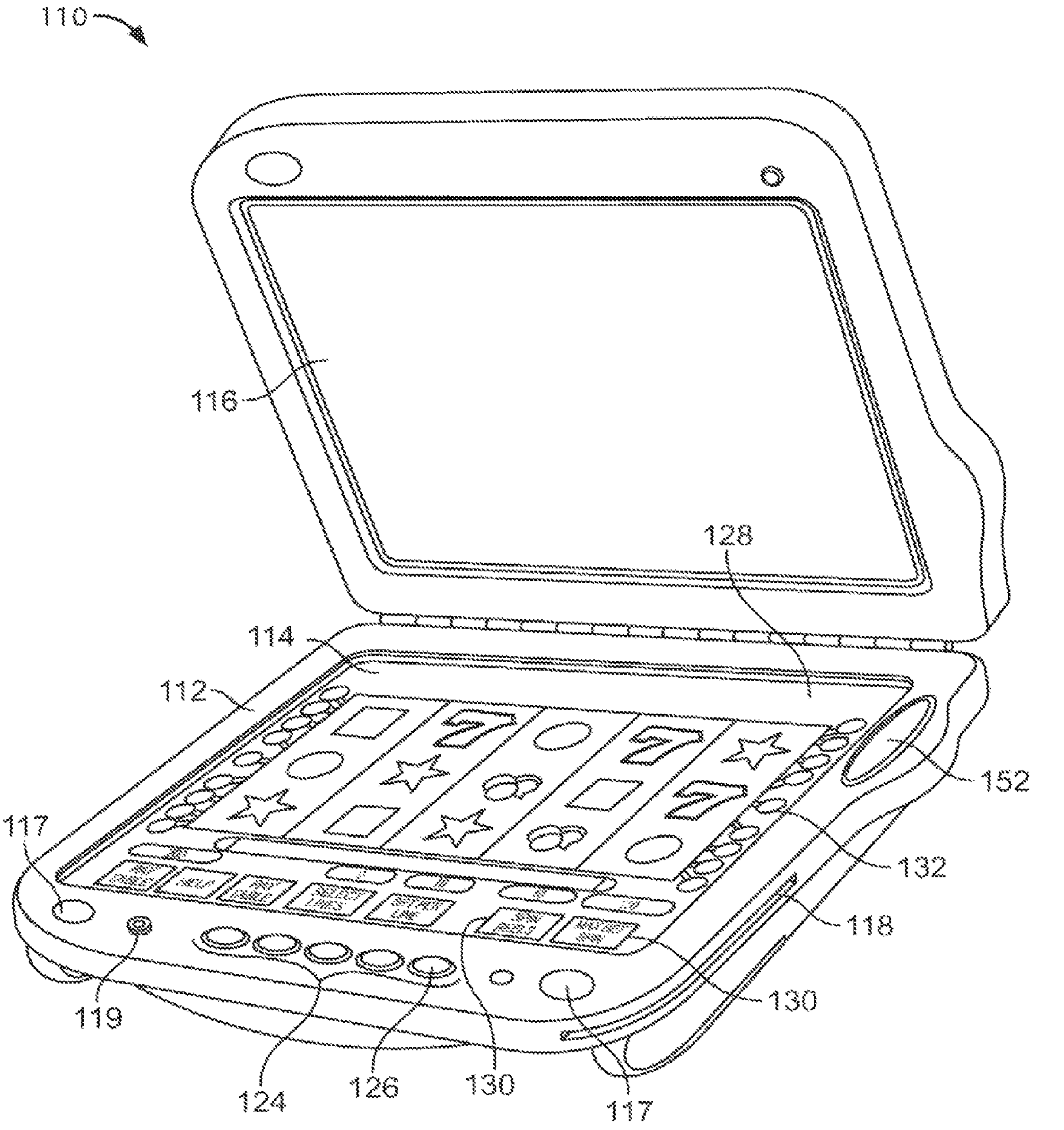
FIG. 1*b* is a perspective view of a handheld gaming machine embodying the present invention.

Depicted in FIG. 1*b* is a handheld or mobile gaming machine 110. Like the freestanding gaming machine 10, the handheld gaming machine 110 is preferably an electromechanical gaming machine configured to play mechanical slots, any other game compatible with a display comprising at least one symbol-bearing reel strip. The handheld gaming machine 110 may also be a hybrid gaming machine integrating both electronic and electromechanical displays. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably includes a number of mechanical reels to display the outcome in visual association with at least one payline. Alternatively, the primary display 114 may take the form of a hybrid display incorporating both electromechanical display components, such as reels, with an electronic display, which may include a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 118 may have a 16:9 aspect ratio or other aspect ratio (e.g., 4:3). The primary display 114 and/or secondary display 116 may also each have different resolutions, different color schemes, and different aspect ratios.

As with the freestanding gaming machine 10, a player begins play of the basic wagering game on the handheld gaming machine 110 by making a wager (e.g., via the value input device 118 or an assignment of credits stored on the handheld gaming machine via the player input device 124, e.g. the touch screen keys 130 or push buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identify (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
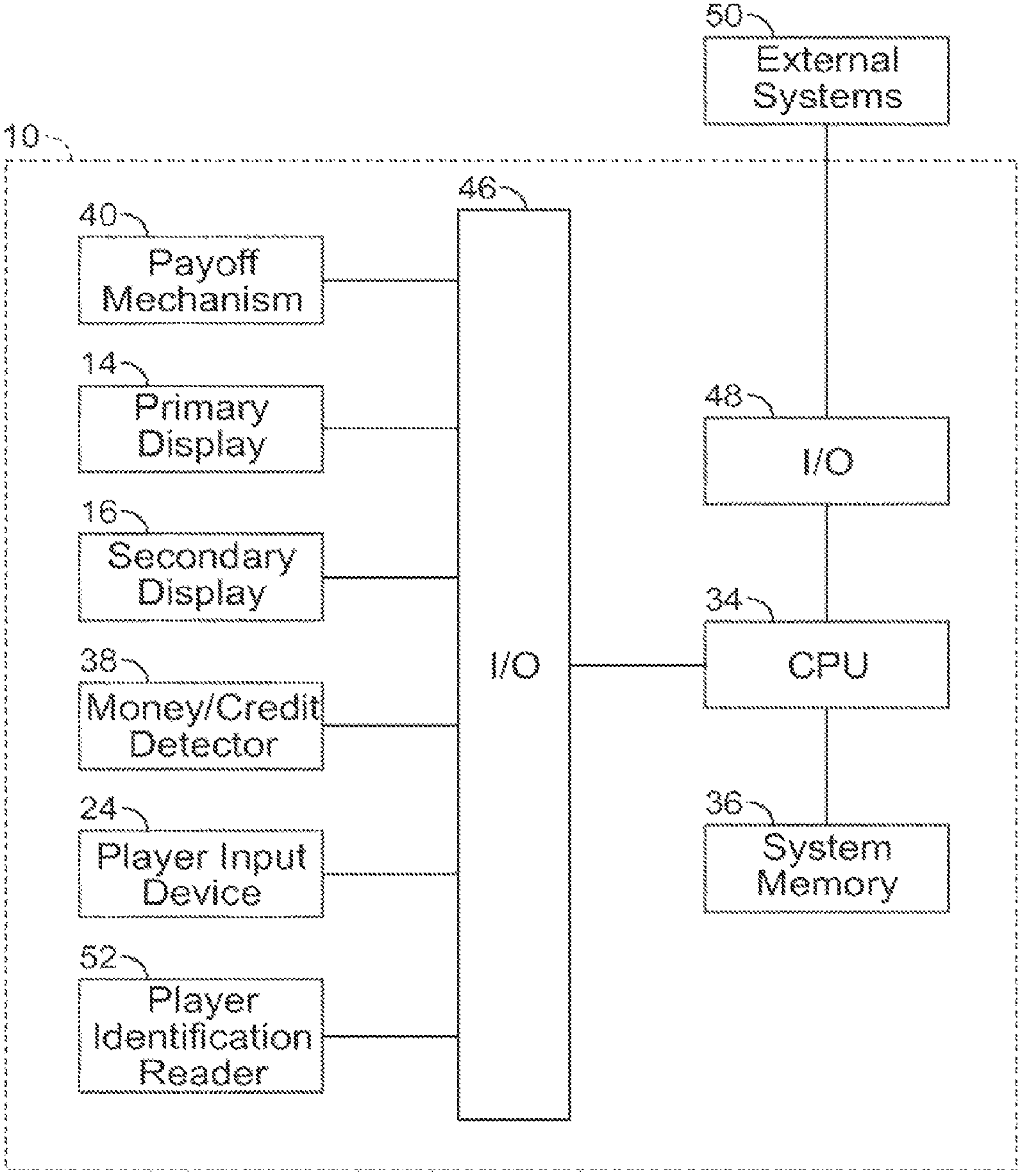
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide earning functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 38 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10, 110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as pad of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10, 110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
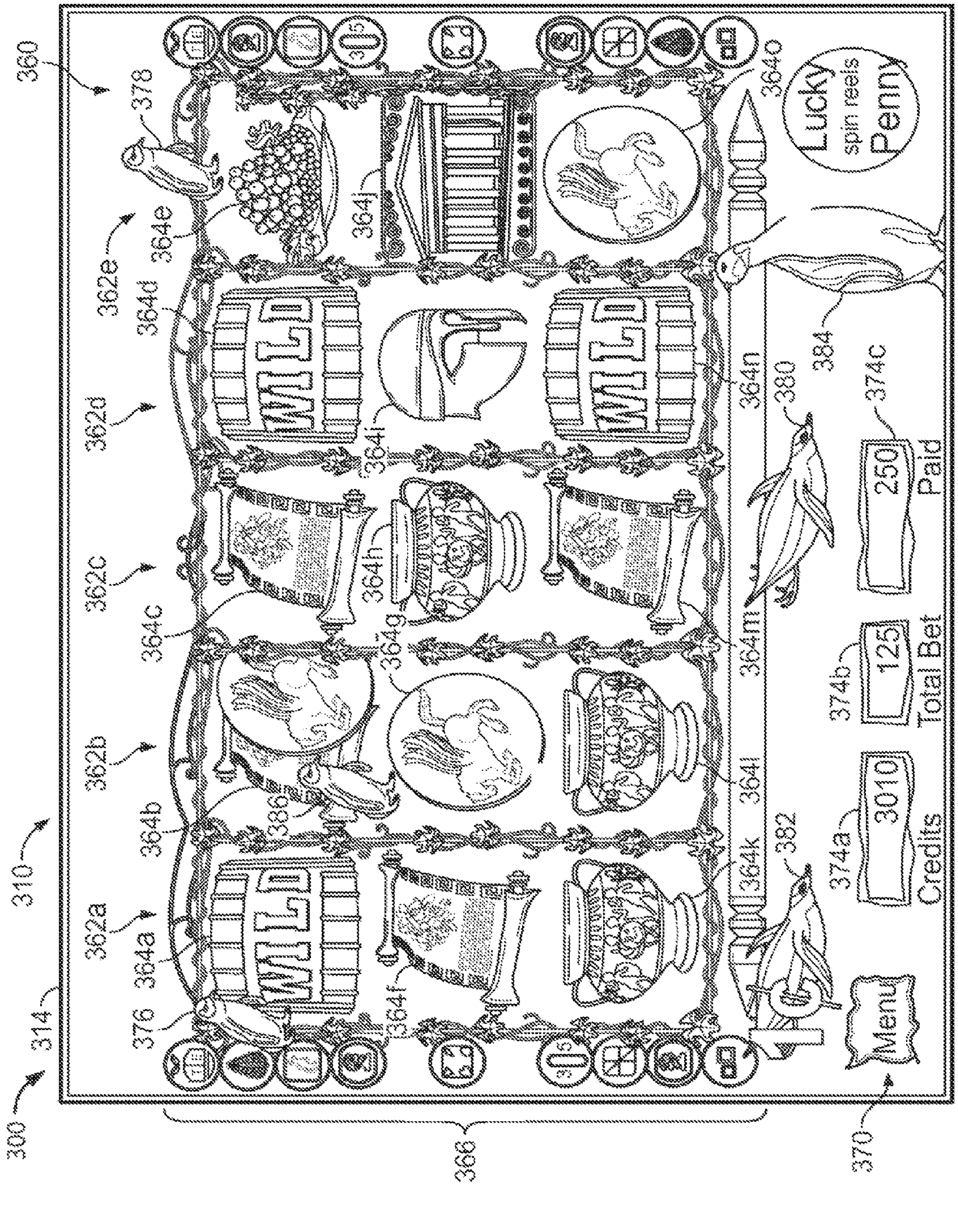
FIG. 3 is a screen shot of a primary display of a gaming system displaying a primary wagering game.

Turning now to FIG. 3, a primary display 314 of a gaming device 310 of a gaming system 300 is shown. The primary display 314 may be any form of display such as those described herein with reference to the free standing and handheld gaming devices of FIGS. 1*a* and 1*b*.

The primary display 314 includes a display of a primary wagering game 360, which in this embodiment is a slot game, entitled Lucky Penny™, as shown in FIG. 3. For the exemplary purpose of describing the wagering game 360, various features will be described as penguin, or bonus, features, however, these features may be advantageously provided in other wagering games and the designations of "penguin" or "bonus" are solely for ease of description. The slot game 360 includes a plurality of reels 362*a,b,c,d,e* which may be either electro-mechanical reels or simulations thereof on the primary display 314. The reels 362*a,b,c,d,e* include a plurality of symbols 364*a*-364*o* displayed thereon that vary as the reels 362*a,b,c,d,e* are spun and stopped. The symbols 364 may include any variety of graphical symbols, elements, or representations, including symbols 364, which are associated with one or more themes of the gaming machine or system. The symbols 364 may also include a blank symbol or empty space.

As described herein the symbols 364 landing on an active payline (the payline or playlines for which a wager has been received) are evaluated for winning combinations. If a winning combination of symbols 364 lands on an active payline, a primary award is awarded in accordance with a pay table of the gaming device. The symbols 364 on the reels 362*a,b,c,d,e* form an array, or matrix of symbols, 366, having a number of rows and columns, which in the embodiment shown is three rows and five columns. In alternate embodiments, the array 366 may have greater or fewer symbols 364, and may take on a variety of different forms having greater or fewer rows and/or columns. The array 366 may even comprise other non-rectangular forms or arrangements of symbols 364.

A control bar 370 appears along the bottom of the display 314. A plurality of meters 374 are displayed on the control bar 370, including a Credit Meter 374*a*, a Total Bet Meter 374*b*, and a Paid Meter 374*c*, The Credit Meter 374*a* displays the number of credits available to a player based upon coin, currency or other value input into the system 300. The Total Bet Meter 374*b* displays the total wager on a single play of the wagering game 360. The Paid Meter 374*c* displays how many credits, if any, have been awarded to the player as a result of a winning outcome on a single play of the primary wagering game 360. If a winning outcome is achieved, the Paid teeter 374*c* displays the size of the win in credits, after which the credits are transferred to the player's balance in the Credit Meter 374*a*, and the Paid Meter 374*c* is reset to zero for a subsequent play of the primary wagering game 360.

The play of the wagering game 360 will now be described with reference to FIGS. 3, 4 and 5. Using the appropriate push buttons 26 and/or touch keys 30, a player begins play by selecting the number of credits to play and the number of credits is decremented on the Credit Meter 374*a*. The player may be required to select a certain number of credits, or play a certain number of credits within a predetermined time period in order to enable the penguin features of the wagering game 360. For example, a player may be required to bet a basic wager of 25 credits and an additional side wager of 25 credits before the penguin features are enabled. After selecting the appropriate credits to enable the penguin features, the player then selects or activates the appropriate push button 26 or touch key 30 begin play or spin the reels 362*a,b,c,d,e*. As shown in FIG. 3, a number of spin enhancement icons, shown as penguins 376, 378, 380, 382, 384 and 386, are shown traversing the display 314. The penguins 376, 378, 380, 382, 384 and 386 traverse, or move, across the display 314 adding penguin, or bonus, features, such as moving items on the screen, changing symbols 362*a-o*, or, as discussed more fully below, providing other exciting and unanticipated changes to the primary wagering game 360.

A number of penguin features to the primary wagering game 360 are shown for illustrative purposes herein. The penguin features may occur at any time and in any combination during the wagering game 360. For instance, one or more penguin features may be activated before a player spins the reels 362*a,b,c,d,e*. One or more penguin features may be activated while one or more of the reels 362*a,b,c,d,e* are spinning, before any pays are made for a spin, after normal pays are made during bangup and after bangup. As is known, bangup is when the credits won are transferred from the Paid Meter 374*c* to the Credit Meter 374*a*. Generally, the bangup consists of quickly decrementing the Paid Meter 374*c* to zero and increasing the Credit Meter 374*a* by the beginning Paid Meter amount.

After the player begins play and the reels 362*a,b,c,d,e* are spinning, the penguins 376, 378, 380, 382, 384 and 386 may traverse the display 314 and provide one or more bonus features before the reels 362*a,b,c,d,e* stop spinning. The bonus features may alternatively occur at any instance of time in the playing of the wagering game 360. For example, the bonus features may be provided by the penguins 362*a,b,c,d,e* after the player presses spin, while each reel 362*a,b,c,d,e* is spinning, after each reef 362*a,b,c,d,e* stops, after a winning outcome of a spin, after a non-winning outcome of a spin, when a bonus game is awarded, if a bonus game is not awarded, and any other instance in the playing of the wagering game 360. The bonus features provided by the penguins 376, 378, 380, 382, 384 and 386 may be one or more changes during a play of the wagering game 360 and may be cumulative to the outcome of the game 360. The bonus features can also combine to supplement each other.

In particular, after the player activates the spin and before the reels 362*a,b,c,d,e* spin, one or more of the penguins 376, 378, 380, 382, 384 and 386 may trigger a bonus and immediately bring the player into bonus, add credits to the Credit Meter 362*a* or award a multiplier for the spin. Various animations of the penguins 376, 378, 380, 382, 384 and 386 may advantageously be employed. One or more of the penguins 376, 378, 380, 382, 384 and 386 may fly across, or traverse the display 314 changing the Credit Meter 372*a* or changing one or more symbols 362*a-o* or even changing one or more reels 362*a,b,c,d,e* resulting in the bonus feature. As shown in FIG. 3 the penguin 386 is in the process of changing the symbol 364*b* from a coin to a scroll. The one or more penguins 376, 378, 380, 382, 384 and 386 may randomly change one or more symbols or may change the one or more symbols in a predetermined pattern on the display, such as in a diamond shaped pattern. Patterned play enhancement features are disclosed in commonly assigned, U.S. patent application Ser. No. 61/123,322 to Hornik, entitled "Wagering Game System and Method with Patterned Enhancement Features," which is incorporated herein by referenced in its entirety.

Figure 4:
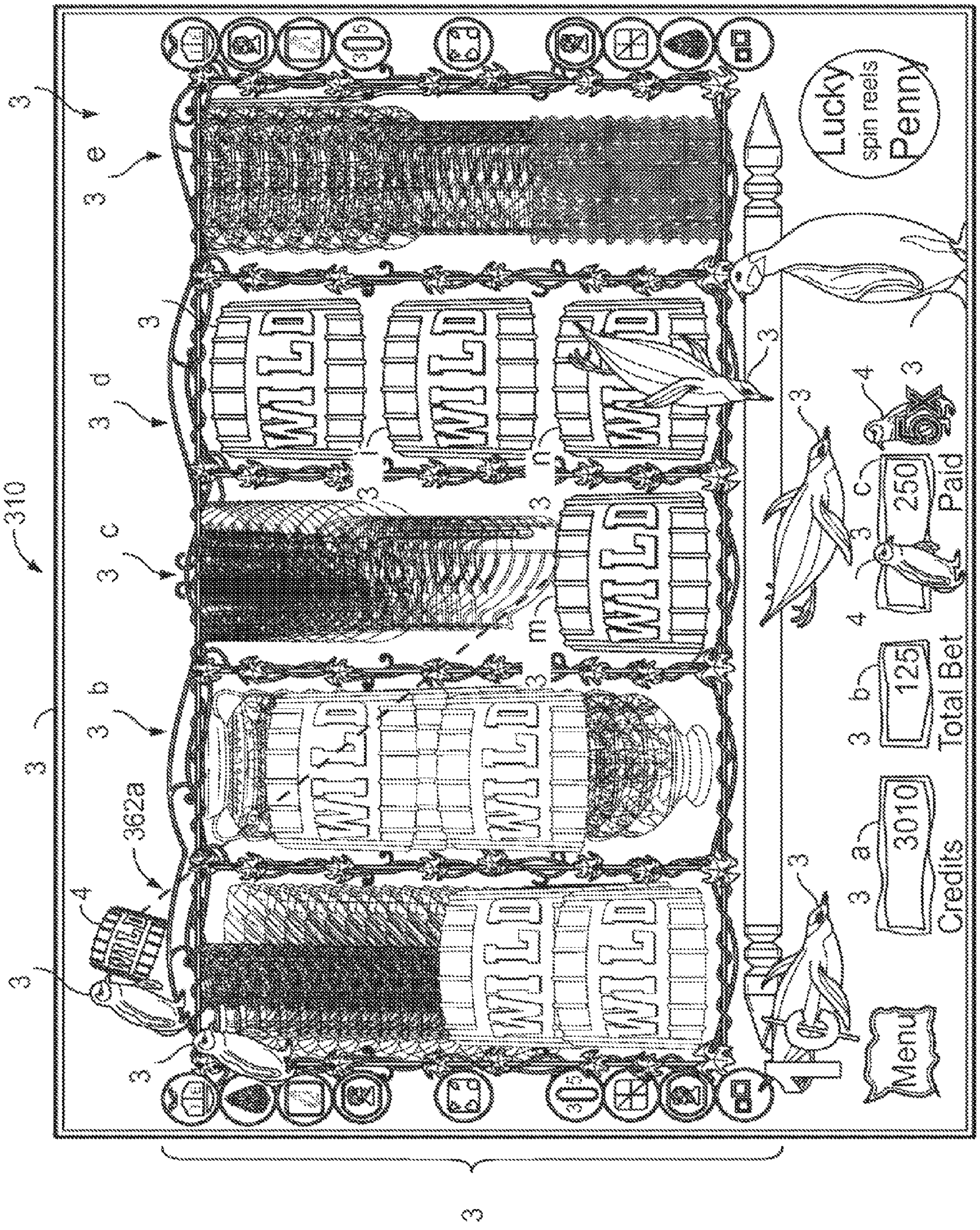
FIG. 4 is a screen shot of the primary wagering game of FIG. 3, displaying a play of the game.

Turning to FIG. 4, penguins 376, 378, 380, 382, 384, 386, 400 and 402 are shown providing various bonus features as the reels 362*a,b,c,d,e* are spinning on the display 314. For example, a bonus multiplier may be superimposed on the penguin 402, in this case a number 5 is shown, which multiplies the spin outcome by 5. If a multiplier is already being applied to this spin outcome through other aspects of the wagering game 360, the bonus multiplier may be added to the existing multiplier, thus increasing an overall spin outcome multiplier. Although the penguin 402 is shown as appearing during the spin, the penguin 402 may be displayed before the spin and the bonus multiplier appears on the penguin 402 during the spin.

During the spin, the penguin 378 is shown traversing, or sliding down, the reel 362*d* and turning all the symbols 364*d, i,n* in the reel 362*d* into WILD symbols. The penguin 386 may be tossing WILD symbols into various of the reels 362*a,b,c, d,e*. In the example shown in FIG. 4, the penguin 386 has tossed a WILD symbol 404 into the reel 362*c* at the symbol 364*m*. The WILD symbol 404 being tossed by the penguin 386 may move up and down a particular reel, in this case the reel 362*c*, until landing on a particular symbol, such as the symbol 364*m*. The penguin 386 may be tossing any type of symbol onto the array of symbols 366. The bonus features may be provided as the reel spins, or alternatively, the reel may stop spinning, the appropriate change made to the reel and then the reel resume spinning. For example, the reel 362*c* may stop as spinning as the penguin 386 moves up and down the reel 362*c* changing one or more of the visible symbols into WILD symbols. After changing the desired number of visible symbols to WILD symbols, the reel 362*c* then resumes spinning.

Other penguin, or bonus, features may be advantageously implemented as the reels 362*a,b,c,d,e* are spinning. For example, the penguin 378 sliding down a reel may turn two, three or more consecutive symbols in the reel into clumped WILD symbols, clumped TOP AWARD symbols or clumped BONUS symbols. The reel may be momentarily stopped as the penguin 378 slides down the reel and resume spinning after the appropriate consecutive symbols are changed. As is known, adding the clumped WILD symbols, as an example, on a spinning wheel increases the chance that a WILD symbol will appear when the reel stops and increases the chance that multiple WILD symbols will appear in that reel. The penguin 378 may change all the symbols on the reel 362*d* into TOP AWARD, WILD or BONUS symbols. As is known in the art, TOP AWARD symbols are the symbols for a particular game which is the highest award on a paytable for that game. The BONUS symbols are also selected symbols which result in particular awards for a particular game. Therefore, TOP AWARD symbol, WILD symbol and BONUS symbol are used herein as generic type identifiers.

Figure 5:
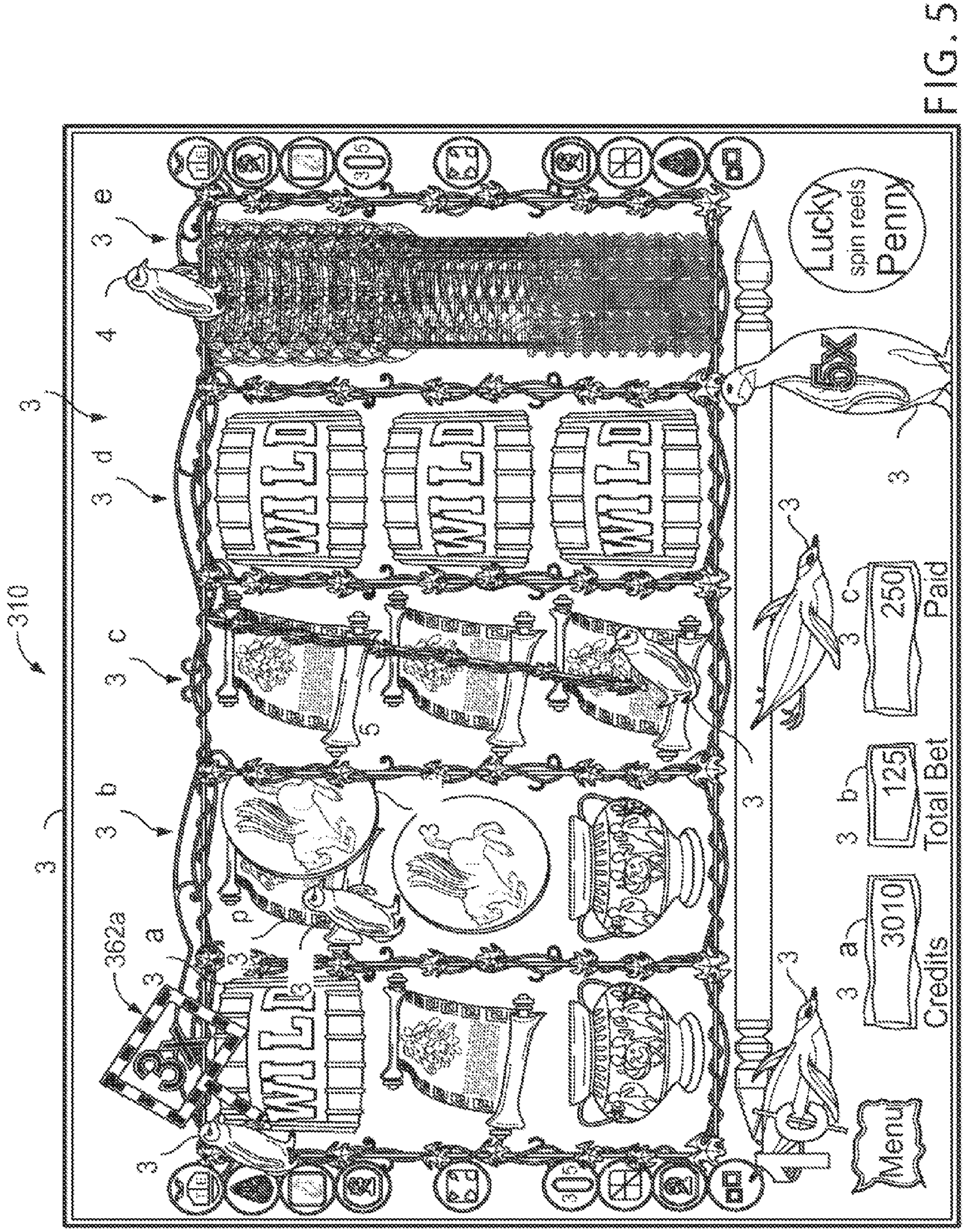
FIG. 5 is a screen shot of the primary wagering game of FIG. 3.

Turning now to FIG. 5, various bonus features are described which may occur singularly or in combination as each reel 362*a,b,c,d,e* stops spinning. The penguin 376 may add WILD symbols to the reels 362*a,b,c,d,e*, such as WILD symbol 364*a*. The penguin 376 is further shown placing a 3× multiplier on top of the WILD symbol 364*a*. The penguin 386 slides away the coin symbol 364*b* to reveal a scroll symbol 364*p*. The scroll symbol 364*p* may then offer a line pay. The penguin 386 may continue to slide away symbols until a symbol is revealed that does offer a line pay. The penguin 378 slides down the reel 362*c* on a vine 500 thereby establishing an additional payline. In this example, the vine 500 establishes a three symbol line pay.

As a reel stops, a penguin may turn a reel into a greatest reel stop of all time turning a reel into all WILD, TOP AWARD or BONUS clumped symbols. Penguin 400 may prolong the spin of reel 362*e* and pull a symbol from a stopped reel, such as the reel 362*c*, and spreads the selected symbol across the entire reel 362*e*. A 5× multiplier appears on the penguin 384 which is used to multiply the spin amount. A penguin may also select a symbol and all instances of that symbol would then pay a scatter award.

The wagering game 360 may further have a bonus award which grants the player one or more free spins. If a bonus is awarded, a penguin may add a multiplier to the bonus award. Further, a player may receive an additional, random penguin for each free spin that is awarded. Similarly, if a bonus is not awarded, a number of bonus, or penguin, features may be implemented. For example, a penguin may immediately trigger a bonus award. If three bonus symbols are needed for a bonus award and only two bonus symbols are displayed, a penguin may add an additional bonus symbol to one of the reels 362*a,b,c,d,e* to immediately trigger the bonus. Instead of adding an additional bonus symbol, a penguin may select one of the reels 362*a,b,c,d,e* to spin a selected number of times in an attempt to provide one more bonus symbols to activate a bonus award.

Figure 6:
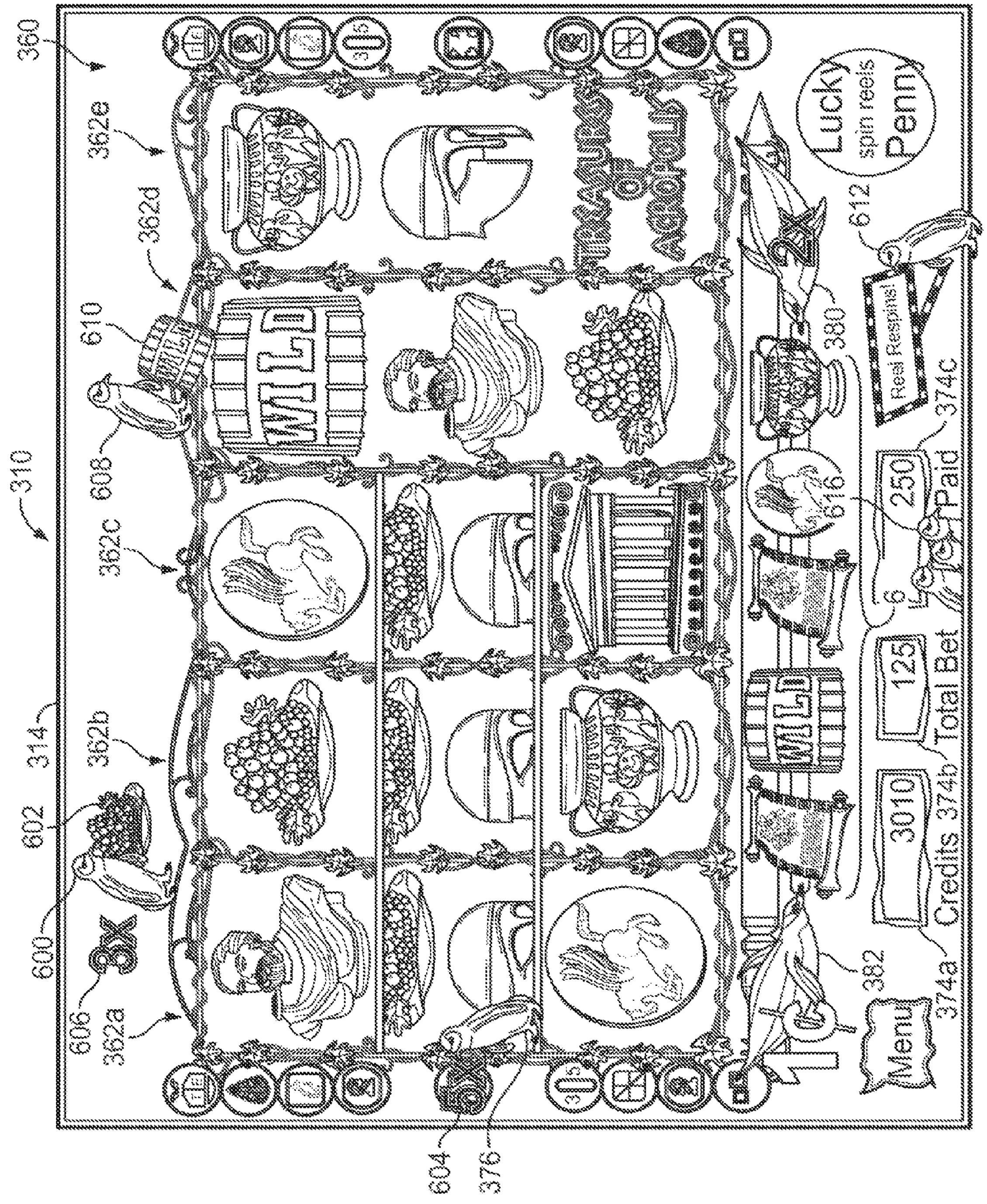
FIG. 6 is a screen shot of the primary game of FIG. 3, displaying a winning outcome with bonus multiplier.

Turning now to FIG. 6, various exemplary bonus penguin features on a winning spin will be described. The penguin 376 may upgrade a winning line to a higher pay. A line multiplier, such a 5× multiplier 604, may appear on the penguin 376. The line is multiplied by the line multiplier 604 or if the line already has a multiplier, increasing the multiplier by the line multiplier 604. A penguin 600 may select a symbol, such as the grape symbol 602, which pays scatter. Therefore, all instances of the grape symbol 602 pay a scatter award. A scatter multiplier, such as a 3× multiplier 606, may be added by the penguin 600 to the scatter pay. The penguin 600 may select the scatter symbol 602 and provide the scatter multiplier 606 to pay scatter times the multiplier 606 for all instances of the scatter symbol 602.

Upon a winning spin, a penguin 608 may add a WILD symbol 610 to one or more reels 362*a,b,c,d,e*. A penguin 612 may select a random reel 362*a,b,c,d,e* to respin a selected number of times. Each of the respins may be evaluated. The highest paying respin may be used, all winning respins may be added together, or any other combination of respins may be advantageously employed. The penguin 612 may respin all reels 362*a,b,c,d,e* to the same positions for a determined number of respins and thereby award the same win for each respin. A penguin may pull a symbol from a winning payline and add clumps of the pulled symbol to one or more reels 362*a,b,c,d,e*.

A penguin, such as the penguin 382, may move a winning payline to a separate penguin payline 614. The penguin payline 614 is then evaluated. The penguin payline 614 value may be doubled each time. In addition, a penguin payline multiplier, such as the 2× multiplier shown on the penguin 380, may be applied to the penguin payline 614 value. A group of penguins 616 may be provided for instantly awarding extra credits. The amount of extra credits may be increased or decreased depending upon the number of penguins in the group of penguins 616. A spin multiplier may appear on a penguin which would be used to multiply the spin outcome. A penguin may also traverse the display 314 and add an additional payline. The spin is then evaluated based on the additional payline and the original payline. Both paylines may be used to determine the linepay or the payline resulting in the higher linepay may be used.

On a losing spin, a number of bonus penguin features may be implemented. A penguin may instantly award extra credits. A plurality of penguins may appear and extra credits are awarded for each of the penguins. A penguin may add WILD symbols to the reels. A penguin may appear and add one or more additional paylines to force a winning spin. A penguin may move WILD symbols to a separate line, fills the separate line with other symbols and evaluates the separate line accordingly.

When the spin ends, a number of bonus penguin features may be implemented. A penguin may traverse the display 314 adding WILD symbols to the reels 362*a,b,c,d,e*. A penguin may move selected symbols to the penguin payline 614 and evaluate the penguin payline 614. A penguin may move a winning payline to a separate line and reevaluate the separate line with a payline multiplier, such as a 2× multiplier. A penguin may build a new separate pay line. For example, a penguin may move one or more WILD symbols to the separate line. If there are any empty spaces in the separate line, the penguin fills the separate line with other random symbols. The separate line is evaluated and the player awarded any credits won on the separate line. A penguin may add a payline to the array 366 to force a winning spin.

The bonus, or penguin, features described herein may be combined to supplement each other in any number of different combinations. For example, before a spin, a multiplier may appear on a penguin indicating that the subsequent outcome will be enhanced accordingly. During the spin, a penguin may insert clumped TOP AWARD symbols in a reel. And after the spin, a penguin may create an additional payline which has its result enhanced by the multiplier. One or more of the penguin features may be triggered at any time, or any combination of times including: before the player presses spin; after the player presses spin but before the reels actually spin; as each reel spins; after each reel stops; after a winning spin; after a losing spin; after a spin ends; if a bonus is awarded; and if a bonus is not awarded.

By graphically adding one or more of the above described penguin features or animations to the display 314, the player is informed that the credits awarded are extra credits paid in addition to the credits due for the winning combination. Thus, to the player the system provides seemingly random and essentially unpredictable extra awards which occur from time to time. This provides the player with added incentive to continue play of the wagering game, in that the player's anticipation of a winning outcome is heightened further by the possibility of receiving the extra awards.

In accordance with an embodiment of the present invention, the bonus features may be implemented at any time in any combination. For illustrative purposes, Table 1 lists a number of penguin features and times they may occur. All actions may be taken by one or more penguins traversing the display.

TABLE 1

| Penguin Features | |
|---|---|
| Time | Features/Actions |
| 1. Player hits spin button. | Upgrade all symbols.<br>Each winning payline pays an additional 50 credits.<br>Mystery bonus awarded. |
| 2. Reels spin. | One or more whole reels are turned wild.<br>Multiplier for spin revealed. |
| 3. Reels stop. | A pattern of symbols are turned wild.<br>Multiple symbols are turned into the same symbols or different symbols.<br>A whole reel is turned wild.<br>Credits are added to meter.<br>Multiplier for spin revealed. |
| 3a. Bonus is awarded. | Selected bonus feature applied every spin.<br>Random chance for selected bonus feature be applied. |
| 3.b. Symbol win is awarded. | Clumps of winning symbol added to reels and spin reevaluated.<br>Respin to same stop and repeat win multiple times.<br>Additional credits put on meter.<br>Multiplier for spin revealed. |
| 4. Spin ends. | Additional credits put on meter.<br>Mystery bonus awarded. |

Although each of these features may be applied individually, the features are also advantageously applied in combinations. For example, each winning line may pay additional credits while concomitantly adding the same symbol to the reels creates multiple wins on a number of paylines and revealing a multiplier provides a multiplicity of exciting and unpredictable outcomes.

Each of these embodiments and obvious variations thereof is contemplated as falling within the spirit and scope of the claimed invention, which is set forth in the following claims.

What is claimed is:

1. A computer-implemented method of conducting a wagering game via a gaming system, the gaming system including one or more input devices, one or more display devices, and one or more processors, the wagering game including a randomly selected game outcome represented, at least in part, by displaying symbols including at least one of a first play-enhancement icon and a second play-enhancement icon, the method comprising:

receiving, via at least one of the one or more input devices, an input indicative of a wager from a player to initiate the wagering game;

randomly selecting, via at least one of the one or more processors, a game outcome from a plurality of possible game outcomes;

displaying, on at least one of the one or more display devices, a plurality of spinning reels to represent randomly selecting the game outcome;

enhancing, via at least one of the one or more processors, the game outcome in direct response to the first play-enhancement icon providing a first bonus feature at any time prior to stopping the spinning reels;

stopping the spinning reels and displaying, on at least one of the one or more display devices, at least a portion of the game outcome including symbols on the plurality of stopped reels; and enhancing the game outcome in direct response to the second play-enhancement icon providing a second bonus feature at any time including before spinning the reels, while the reels are spinning, and after the reels stop spinning.

2. The method of claim 1, wherein the game outcome triggers a bonus game.

3. The method of claim 1, wherein the game outcome is enhanced by respinning at least one of the reels a selected number of respins.

4. The method of claim 1, wherein the first bonus feature includes respinning at least one of the reels a selected number of respins and the second bonus feature adds additional respins.

5. The method of claim 1, wherein the game outcome is enhanced by forming an additional pay line on at least one of the one or more display devices.

6. The method of claim 1, wherein the game outcome is enhanced by stopping one or more of the spinning reels, changing one or more reel symbols on the stopped one or more reels, and resuming spinning the stopped one or more reels.

7. A computer-implemented method of conducting a wagering game via a gaming system, the gaming system including one or more input devices, one or more display devices, and one or more processors, the wagering game including a randomly selected game outcome represented, at least in part, by displaying symbols including at least one of a first play-enhancement icon and a second play-enhancement icon, the method comprising:

receiving, via at least one of the one or more input devices, an input indicative of a wager from a player to initiate the wagering game;

randomly selecting, via at least one of the one or more processors, a game outcome from a plurality of possible game outcomes;

displaying, on at least one of the one or more display devices, a plurality of spinning reels to represent randomly selecting the game outcome;

enhancing, via at least one of the one or more processors, the game outcome in direct response to the first play-enhancement icon providing a first bonus feature at any time prior to stopping the spinning reels;

stopping the spinning reels and displaying, on at least one of the one or more display devices, at least a portion of the game outcome including symbols on the plurality of stopped reels; and enhancing the game outcome in direct response to the second play-enhancement icon providing a second bonus feature at any time including before spinning the reels, while the reels are spinning, and after the reels stop spinning, wherein the second bonus feature can enhance the game outcome in the absence of, and in addition to, any enhancements resulting from the first bonus feature.

8. The method of claim 7, wherein the first bonus feature and the second bonus feature cumulatively enhance the game outcome.

9. The method of claim 7, wherein the first bonus feature and the second bonus feature provide a combined enhancement to the game outcome.

10. The method of claim 7, wherein the game outcome triggers a bonus game and at least one of the first and second bonus features enhances a bonus game outcome.

11. The method of claim 7, wherein one of the first and second bonus features triggers a bonus game and the other of the first and second bonus features enhances the bonus game.

12. The method of claim 7, wherein the first bonus feature includes one or more of a reel respin, a bonus multiplier, and adding a WILD symbol to the displayed reels.

13. The method of claim 12, wherein the second bonus feature includes one or more of a reel respins, a bonus multiplier, and adding a WILD symbol to the displayed reels.

14. The method of claim 7, wherein the first bonus feature applies a first bonus multiplier to the game outcome and the second bonus features applies a second bonus multiplier to the game outcome, the first and second bonus multipliers adding together to apply a combined multiplier to the game outcome.

15. A gaming system configured to conduct a wagering game including a randomly selected outcome represented, at least in part, by displaying symbols including at least one of a first play-enhancement icon and a second play-enhancement icon, the gaming system comprising:

one or more input devices;

one or more display devices;

one or more processors; and one or more memory devices storing instructions that, when executed by at least one of the one or more processors, cause the gaming system to:

receive an input indicative of a wager from a player to initiate the wagering game;

randomly select a game outcome from a plurality of possible game outcomes;

display a plurality of spinning reels to represent randomly selecting the game outcome;

enhance the game outcome in direct response to the first play-enhancement icon providing a first bonus feature at any time prior to stopping the spinning reels;

stop the spinning reels and display at least a portion of the randomly selected game outcome including the symbols on the plurality of reels;

enhance the game outcome in direct response to the second play-enhancement icon providing a second bonus feature at any time including before spinning the reels, while the reels are spinning, and after the reels stop spinning.

16. The gaming system of claim 15, wherein the first bonus feature and the second bonus feature cumulatively enhance the game outcome.

17. The gaming system of claim 15, wherein at least one of the first and second bonus features includes awarding an additional play-enhancement icon that provides an additional bonus feature.

18. The gaming system of claim 15, wherein the first bonus feature and the second bonus feature provide a combined enhancement to the game outcome.

19. The gaming system of claim 15, wherein the game outcome triggers a bonus game and at least one of the first and second bonus features enhances a bonus game outcome.

20. The gaming system of claim 15, wherein one of the first and second bonus features triggers a bonus game and the other of the first and second bonus features enhances the bonus game.

* * * * *